MAGNETOSTRICTIVE RECORD AND RECORDING APPARATUS

Filed May 19, 1958

INVENTOR

Simon Levin

United States Patent Office 3,144,520

Patented Aug. 11, 1964

3,144,520

MAGNETOSTRICTIVE RECORD AND RECORDING APPARATUS

Simon Levin, 123 W. 44th St., New York, N.Y.

Filed May 19, 1958, Ser. No. 736,311

16 Claims. (Cl. 179—100.2)

The invention relates to methods and means for recording magnetic information in such media as tapes, sheets, discs, and the like. More particularly the invention relates to simple and novel methods and means for recording a representation of a wide band of information without recourse to video magnetic recording apparatus now in common usage.

By the method and means of the invention, a series of magnetic frames comparable to a conventional motion picture film may be produced, each frame containing the equivalent of the optical information of the film but recorded as magnetic configurations. In addition, magnetic representations of waveforms, linear and non-linear, audio or video, may be recorded by the method and means of the invention.

Many magnetic materials have the property of magnetostriction, whereby the material undergoes a change in size or shape when it is subject to a magnetic field. Conversely, such materials when subjected to a conditioning field (for example a polarizing or transfer field which may be magnetic or electric) and stressed mechanically, a change will occur in the residual magnetization (remanence) produced by the conditioning field. This phenomenon is described in detail in Patent No. 2,942,928, dated June 28, 1960, of the present applicant.

When a mechanical stress is applied to a conditioned magnetostrictive material, the remanence will change in function of the stress. When the stress is removed, the remanence tends to return in the direction of its original value and depending on the composition of the material utilized, the residual magnetization may vary from a value somewhat larger than the value before stress to a value substantially the same as that obtained with maximum stress.

It is a principal object of the invention to provide methods and apparatus for obtaining a substantially uniform range of final remanent values in the record carrier of the invention even though a large variation in the residual magnetization may exist between the stressed and unstressed condition of the magnetostrictive materials utilized in the construction of the record carrier.

Another object of the invention is to provide methods of and apparatus for magnetizing one medium which is not necessarily magnestrictive by means of another medium which is magnetostrictive.

It is a further object of the invention to provide methods and apparatus whereby the magnetization produced in a low or substantially non-magnetostrictive material by a magnetostrictive material may be made representative of a wide band of information.

These and other objects of the invention will be more apparent from the following description, appended claims and the accompanying drawings wherein:

Figures 1, 2, 3:
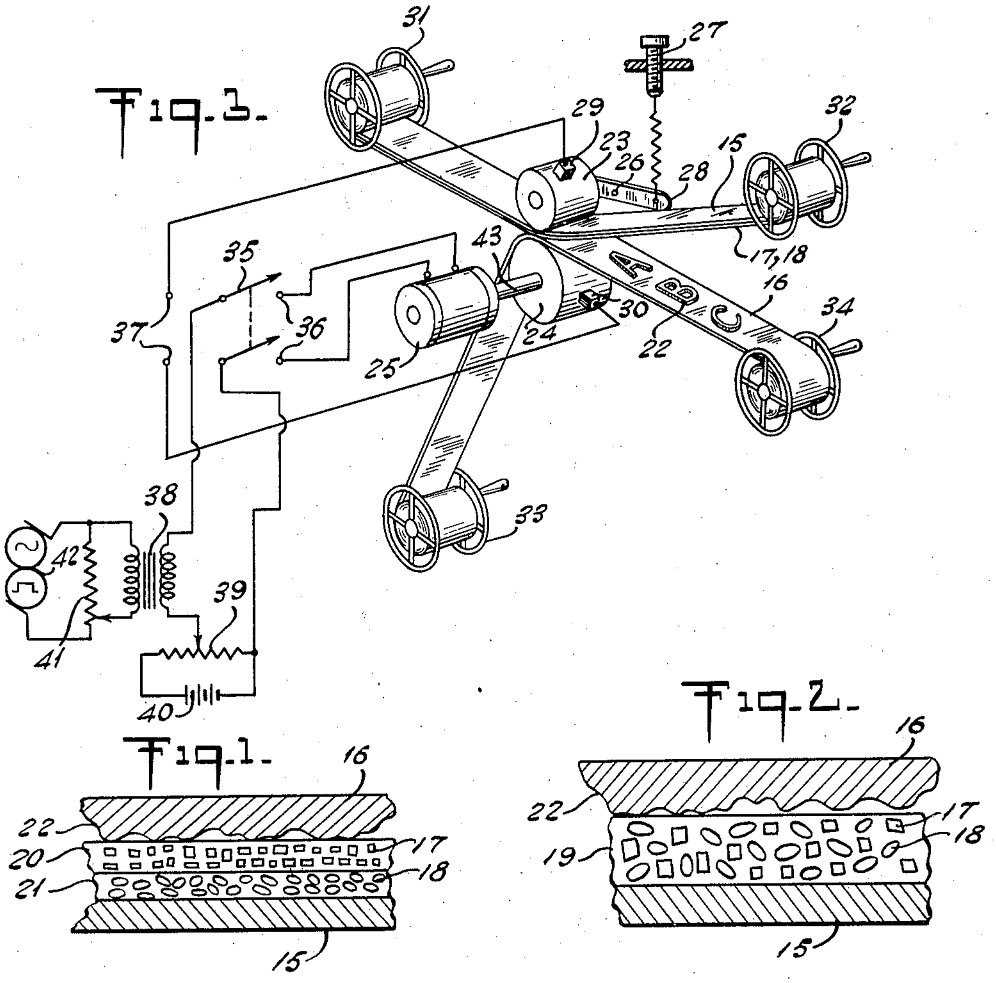
FIGURE 1 is a fragmentary view of one construction of a tape or web utilized in accordance with the invention.
FIGURE 2 is a fragmentary view of another construction of a tape or web in accordance with the invention.
FIGURE 3 illustrates an embodiment of the invention wherein the transducer medium is applied to the tape or web and the field conditioning means are detailed.

Referring to FIGURE 1, reference number 16 indicates a transducer medium comprised of metal (preferably nonmagnetic although magnetic materials are operable with the invention), cellulose compositions, polyesters or the like and having a raised pattern 22 similar to a bas-relief which may be made by engraving, etching, photogelatine, collotype or other relief processes well known to the graphic arts.

A carrier base 15 comprised, for example, of paper, cellulose acetate or the like is coated with a resinous or plastic binder layer 21 throughout which is dispersed the comminuted particles 18 comprised of a magnetic material which has a low magnetostriction or is substantially nonmagnetostrictive such as, for example, gamma ferric oxide. Coated upon the layer 21 is the layer 20 which may be comprised of the same binder material as the layer 21 and which has dispersed throughout the comminuted particles 17 of a magnetostrictive material such as cobalt ferrite.

In the practice of the invention, the layer 20 may also be comprised of a tape without a carrier base, the binder with the particles 17 dispersed throughout serving as a separate vehicle which may be used and reused by being temporarily placed in contact with the layer 21 during a recording operation.

Another suitable construction for the record carrier is shown in FIGURE 2 wherein the magnetostrictive particles 17 are thoroughly interspersed with the non-magnetostrictive particles 18 in a single layer 19 on the base member 15. Although a random dispersion of the particles 17 and 18 is suitable for the practice of the invention, a preorientation of the particles 17 and 18 will provide more effective control of the transfer of the magnetism from particles 17 to particles 18. For example, during fabrication, a magnetic field is applied before the binder has hardened so that the axis of the particles 17 most sensitive to stress are aligned in the direction of the stresses to be applied by the transducer 16. At the same time the particles 18 will align with their axis of easy magnetization in the same direction as the stress sensitive axis of particles 17 so that during the recording operation, as described hereafter, effective transfer of magnetization takes place.

The binder 19 with the particles 17 and 18 dispersed as described may also be utilized without the carrier base 15.

Referring to FIGURE 3, there is shown the transducer tape or web 16 having the raised pattern 22 which is placed in contact with a tape or web 15 constructed as preferred in the manner as described for FIGURE 1 or FIGURE 2 and transported by the reels 31, 32, 33 and 34 in a manner (by means not shown) to provide equal velocities for the transducer tape 16 and the record tape 15 as they traverse a conditioning pulley 24 and a stressing pulley 23. The conditioning pulley 24 is comprised of a magnetic material and may be magnetized by means of the shaft 43 serving as a core for the coil 25. The stressing pulley 23 may be comprised of a magnetic material similar to the conditioning pulley 24. A sliding contact on the pulley 23 is connected to the side 37 as shown. The throw arm of the switch 35 is connected to a power supply 40 for providing a direct current or voltage adjustable with the control 39 and an alternating current from the oscillator 42 adjustable with the control 41 and coupled to the supply output by the transformer 38. The coil 25 is connected to the other side of the switch 35 at contacts 36. When the switch 35 closes the circuit through the contacts 36, the coil 25 may be energized with a direct, alternating or pulsating current which causes the conditioning pulley 24 to be magnetized. The stressing pulley 23 provides a low reluctance path for the magnetism from the pulley 24 thus forming a magnetic field through which the record tape 15 and the transducer tape 16 pass during the recording operation.

With the switch 35 in a position that closes the circuit through the contacts 37, a direct, alternating or pulsating electric field may be developed between the pulley 23 and the pulley 24.

The stress pulley 23, mounted on the arm 28 which is movable about the pivot 26, is adjustable by means of the screw 54.

The record tape 15 may be constructed, for example, with magnetostrictive particles 17 comprised of cobalt ferrite and with the particles 18 comprised of gamma ferric oxide. To condition the tape 15 directly with a magnetic polarizing field, the switch 35 is closed at contacts 36, the control 39 adjusted to cause the tape 15 to be magnetized in a region below its saturation point and the screw 54 is adjusted so that the stressing pulley 23 causes the transducer tape 16 to contact the record tape 15. The stressing pulley 23 applies, in effect, a biasing stress which has superimposed the stresses of the raised pattern 22. Optimum values for the conditioning field and the biasing stress may be readily ascertained after a few trials.

As the particles 17 are stressed by the raised pattern 22 their magnetization increases in function of stresses from the various areas of the raised pattern 22 and the particles 18 are magnetized by the particles 17 to a magnetization above the level of that produced by the conditioning field in the particles 18. As the stress of the raised pattern is removed the magnetization in the particles 17 will decrease but generally will not return to its original unstressed value. The particles 18, however will retain a level of magnetization at substantially the same level of magnetization of the particles 17 when fully stressed in function of the various areas of the raised pattern 22.

By adjustment of the control 41, a fluctuating magnetic field may be superimposed upon the initial magnetizing field and it will be found that more effective control may be had of the transfer of the fields from the particles 17 to the particles 18 and the characteristics of the particles 17 and 18 such as linearity, gradation, contrast and the like. This fluctuating field may be sinusoidal or consist of pulses which will be found to be especially effective for field transference.

An electric field may be utilized for conditioning purposes by placing switch 35 into the contacts 37 as stated hereinbefore. An electric field will produce currents in a magnetic material which will cause it to become magnetized. In the magnetostrictive particles 17 the magnetization will vary in function of the stresses applied by the transducer tape 16.

The foregoing has described a record tape or web 15 comprised of cobalt ferrite and gamma ferric oxide and utilized in accordance with the invention. Many other compositions of magnetostrictive, partly magnetostrictive and non-magnetostrictive materials may be utilized and these are well known in the art.

The electric conditioning field is advantageous where metallic magnetostrictive materials are used with ceramic or oxide types of non-magnetostrictive materials for constructing the record 15. The electric field may be readily adjusted so that magnetizing currents occur in the conductive metallic magnetostrictive material while the substantially non-conductive ceramic or oxidic is unmagnetized by the conditioning field, the final magnetization resulting only from the magnetic fields transfered from the magnetostrictive material. A larger differential between minimum and maximum magnetization of the record 15 is thus provided. With certain preferred materials a combination of electric and magnetic fields will give the desired results and this can be determined readily by a few trials. Magnetostrictive materials with coercive forces higher than the coercive forces of the non-magnetostrictive materials will also be advantageous in the practice of the invention.

The raised pattern 22 which is utilized to stress the recording tape 15 may comprise a high contrast configuration as shown in FIGURE 3 or may have a long scale of gradation as would be found, for example, in a landscape or pictorial view, these views being positioned as a series of frames on the base 16 in a like manner as a conventional motion picture film. The raised pattern 22 may comprise a representation of a waveform. For example, a variable area or variable density film record of audio frequencies may be converted to the raised pattern 22 by any of the methods described hereinbefore and when used to stress the record member of the invention will provide a simple and inexpensive means for making duplicate copies of sound tapes. A conventional sound on film motion picture may be converted in a like manner providing a simple and convenient magnetic source.

In lieu of a tape 16 with a raised pattern 22, a stylus driven by a transducer may be utilized to mechanically stress the record member of the invention in the manner as described in the above referenced previous patent of the applicant.

Figure 4:
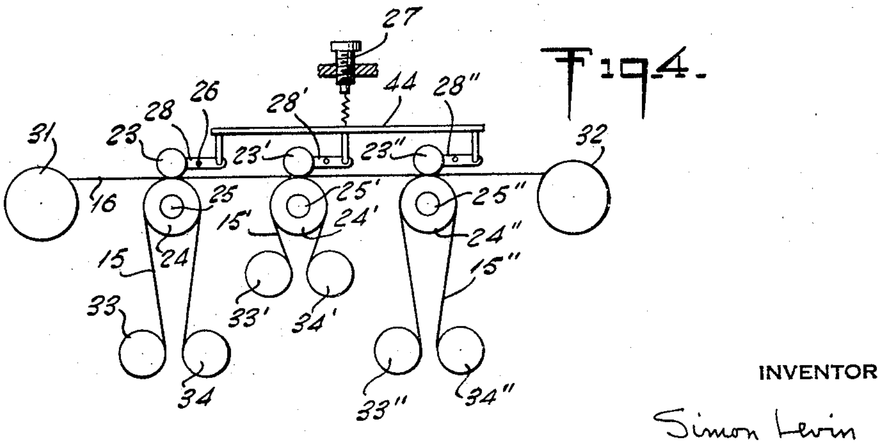
FIGURE 4 shows a plurality of tapes or webs being applied to a transducer medium in another embodiment of the invention.

FIGURE 4 shows a modification of the apparatus described in FIGURE 3 wherein the transducer tape 16, transported by reel 31 and reel 32 is utilized for impressing the magnetic information in a plurality of record tapes 15, 15′ and 15″, the stressing pulleys 23, 23′, 23″ being coupled by means of the member 44 to the adjustment screw 54. If preferred, each stress pulley may be adjusted individually in accordance with the invention. The tapes 15, 15′, 15″ may be conditioned with magnetic or electric fields in the manner as described in FIGURE 3.

It is to be understood that various equivalents of the embodiments disclosed may be used without departing from the spirit of the invention.

What is claimed is:

1. In a magnetic recording apparatus, an information carrier comprising a first magnetostrictive medium which is adapted to be remanent changed by mechanical stresses, a second magnetic medium adapted to be remanent changed by the remanent change of said first magnetostrictive medium, said first magnetostrictive medium and said second magnetic medium comprising a combined medium of interspersed comminuted particles; said mechanical stresses being representative of information to be stored in said second magnetic medium.

2. In a magnetic recording apparatus, an information carrier comprising a first magnetostrictive medium which is adapted to be remanent changed by mechanical stresses, a second magnetic medium adapted to be remanent changed by the remanent change of said first magnetostrictive medium, said first magnetostrictive medium and said second magnetic medium each thereof comprised of comminuted particles; said mechanical stresses being representative of the information to be stored in said second magnetic medium.

3. In a magnetic recording apparatus, an information carrier comprising a first magnetostrictive medium which is adapted to be remanent changed by mechanical stresses, said first magnetostrictive medium comprised of comminuted particles adapted to have a preferred orientation with respect to said mechanical stresses whereby said remanence can be controlled, and a second magnetic medium adapted to be remanent changed by the remanent change of said first magnetostrictive medium whereby a magnetic replica of said mechanical stresses is established in said second magnetic medium.

4. In a magnetic recording apparatus, an information carrier comprising a first magnetic medium adapted to be remanent changed by mechanical stresses, a second magnetic medium adapted to be remanent changed by the remanent change of said first magnetic medium, said second magnetic medium comprised of comminuted particles in a binder adhering to a base member, said first magnetic medium comprised of comminuted particles in a binder serving as a separable carrier, said mechanical stresses being representative of information to be stored in said second magnetic medium.

5. In a magnetic recording apparatus, an information carrier comprising a first magnetic medium adapted to be remanent changed by mechanical stresses, a second magnetic medium adapted to be remanent changed by the remanent change of said first magnetic medium, said first magnetic medium comprising comminuted particles in a binder adhered to a second binder comprising comminuted particles of said second magnetic medium, said mechanical stresses being representative of information to be stored in said second magnetic medium.

6. In a magnetic recording apparatus, an information carrier comprising a first magnetic medium adapted to be remanent changed by mechanical stresses, a second magnetic medium adapted to be remanent changed by the remanent change of said first magnetic medium, said first magnetic medium and said second magnetic medium being comprised of comminuted particles, said first magnetic medium being adapted to have a coercive force which is greater than the coercive force of said second magnetic medium whereby a magnetic replica of said mechanical stresses is established in said magnetic medium.

7. An apparatus for recording magnetic information which comprises means for combining a first magnetostrictive medium with a second magnetic medium, means for applying a conditioning field to said combined mediums, and means for mechanically stressing said combined mediums with a transducer means whereby a magnetic replica of said mechanical stresses is established in said second magnetic medium.

8. An apparatus for recording magnetic information which comprises a recording medium, said recording medium comprising a first magnetic material adapted to be remanent changed by mechanical stresses, a second magnetic material adapted to be remanent changed by the remanent change of said first magnetic medium, means for subjecting said recording medium to a conditioning field, said second material being of the type adapted to retain a magnetic replica of said mechanical stresses.

9. An apparatus for recording magnetic information which comprises a recording medium, a magnetostrictive medium, means for subjecting said magnetostrictive medium to a conditioning field, means for transporting said magnetostrictive medium cooperative with said recording medium, means for subjecting said magnetostrictive medium to mechanical stresses whereby the change in magnetization of said magnetostrictive medium causes a change in the magnetization of said recording medium, said mechanical stresses being representative of information to be stored in said recording medium.

10. An apparatus for recording magnetic information which comprises a magnetic recording medium, a magnetostrictive medium, transducer means for positioning said magnetostrictive medium in contact with said recording medium, means for subjecting said magnetostrictive medium and said magnetic recording medium to a conditioning field, said transducer means adapted for physically stressing said magnetostrictive medium whereby the change in magnetization of said magnetostrictive medium causes a change in the magnetization of said magnetic recording medium.

11. An apparatus for recording magnetic information which comprises a magnetic recording medium, a magnetostrictive medium, a plurality of transducer means adapted to subject said magnetostrictive medium to said magnetic recording medium, said plurality of transducer means adapted to mechanically stress said magnetostrictive medium; and means for subjecting said magnetostrictive medium and said magnetic recording medium to a conditioning field whereby the change in magnetization of said magnetostrictive medium causes a change in the magnetization of said magnetic recording medium.

12. An apparatus for recording magnetic information which comprises a transducer medium, means for forming a raised pattern in said transducer medium, means for combining a first magnetostrictive medium with a second magnetic medium, means for stressing said combined mediums with said raised pattern; and means for applying a conditioning field to said combined mediums whereby a magnetic replica of said raised pattern is established in said mediums.

13. An apparatus for recording magnetic information which comprises a first carrier medium, said first carrier medium comprising a magnetostrictive material and a second magnetic material, a second carrier, said second carrier comprising a medium having areas thereof at levels different from levels of other areas thereof, said areas representing information to be recorded, means for applying a conditioning field to said first carrier medium and means for subjecting said areas of said second carrier to said first magnetostrictive material of said first carrier medium whereby the change in magnetization of said first magnetostrictive material causes a change in the magnetization of said second magnetic material.

14. An apparatus for recording magnetic information which comprises a first information carrier, said first carrier comprising a first magnetostrictive material and a second magnetic material, a second carrier having areas thereof at levels different from levels of other areas thereof, said areas representing information to be recorded, means for placing said first carrier in contact with said areas of said second carrier, means for moving said first carrier and said second carrier in cooperation with means for stressing said first magnetostrictive material with said areas of said second carrier simultaneously with the application of a conditioning field whereby a change in remanence of said first magnetostrictive material causes a change in remanence of said second magnetic material.

15. An apparatus for recording magnetic information which comprises a first information carrier, said first carrier comprising a first magnetostrictive material and a second magnetic material, a second carrier having a raised pattern representative of the information to be recorded, stressing means for placing said first carrier in contact with said raised pattern, means for transporting said first carrier and said second carrier, said stressing means adapted to apply a conditioning field to said first carrier and said second carrier whereby the magnetization of said second magnetic material is controlled by the stresses applied to said first magnetostrictive material.

16. An apparatus for recording magnetic information which comprises a plurality of first record carriers, each of said first record carriers comprising a first magnetostrictive material and a second magnetic material, a second carrier having a raised pattern representative of information to be recorded, means for placing said plurality of first record carriers in contact with said raised pattern, means for moving said plurality of first record carriers and said second carrier in cooperation with means for stressing each of said first magnetostrictive materials with said raised pattern; and means for applying a conditioning field to said plurality of first record carriers whereby said second magnetic material is impressed with a magnetic replica of said raised pattern.

References Cited in the file of this patent

UNITED STATES PATENTS

| | | |
|---|---|---|
| 2,683,856 | Kornei | July 13, 1954 |
| 2,686,229 | Blaney | Aug. 10, 1954 |
| 2,921,989 | Serrell | Jan. 19, 1960 |

OTHER REFERENCES

R. F. Scott article, pages 16 and 65 of November 1946, Radio Craft.